United States Patent
Allan

(10) Patent No.: US 11,265,299 B2
(45) Date of Patent: Mar. 1, 2022

(54) OBSCURED RETRIEVAL SEQUENCE FOR INFORMATION CENTRIC NETWORKING (ICN) ENCODED VIDEO STREAMS

(71) Applicant: Telefonaktiebolaget LM Ericsson (publ), Stockholm (SE)

(72) Inventor: David Ian Allan, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 438 days.

(21) Appl. No.: 16/302,536

(22) PCT Filed: May 23, 2016

(86) PCT No.: PCT/IB2016/053023
§ 371 (c)(1),
(2) Date: Nov. 16, 2018

(87) PCT Pub. No.: WO2017/203322
PCT Pub. Date: Nov. 30, 2017

(65) Prior Publication Data
US 2019/0306133 A1    Oct. 3, 2019

(51) Int. Cl.
*H04L 29/06* (2006.01)
*G06F 9/455* (2018.01)
(Continued)

(52) U.S. Cl.
CPC ...... *H04L 63/0457* (2013.01); *G06F 9/45558* (2013.01); *G06F 21/10* (2013.01);
(Continued)

(58) Field of Classification Search
CPC ... H04L 63/0457; H04L 63/062; H04L 63/04; H04L 9/3213
(Continued)

(56) References Cited

U.S. PATENT DOCUMENTS

| | | | |
|---|---|---|---|
| 8,369,248 B2* | 2/2013 | Terada | H04W 12/06 370/260 |
| 2012/0185448 A1* | 7/2012 | Mensch | G06F 16/13 707/693 |

(Continued)

FOREIGN PATENT DOCUMENTS

| | | |
|---|---|---|
| CN | 1728039 A | 2/2006 |
| CN | 101512523 A | 8/2009 |

(Continued)

OTHER PUBLICATIONS

First Chinese Office Action for Chinese Patent Application No. CN 201680087909.2 dated Oct. 30, 2020, 7 pages (including English translation).

(Continued)

*Primary Examiner* — Teshome Hailu
(74) *Attorney, Agent, or Firm* — Sage Patent Group

(57) ABSTRACT

A method is implemented by a network device operating as a content node for securely distributing a content object over an information centric networking (ICN) network. The method implements a unique obscured retrieval sequence. The method includes receiving an interest for a chunk of the content object from a client device, where the chunk is identified with an obscured chunk identifier, translating the obscured chunk identifier into a general chunk identifier for the content object, and sending the chunk of the content object to the client device.

13 Claims, 7 Drawing Sheets

(51) Int. Cl.
*G06F 21/10* (2013.01)
*H04L 9/32* (2006.01)

(52) U.S. Cl.
CPC ............ *H04L 9/3213* (2013.01); *H04L 63/04* (2013.01); *H04L 63/062* (2013.01); *G06F 2009/45595* (2013.01); *G06F 2221/0784* (2013.01)

(58) Field of Classification Search
USPC ........................................................ 713/159
See application file for complete search history.

(56) References Cited

U.S. PATENT DOCUMENTS

| | | | | |
|---|---|---|---|---|
| 2013/0101113 | A1* | 4/2013 | Cannon | ............... G06F 21/6209 380/44 |
| 2013/0103945 | A1* | 4/2013 | Cannon | ............... G06F 21/6209 713/168 |
| 2015/0271541 | A1* | 9/2015 | Gonder | ................ H04L 65/608 725/134 |
| 2016/0006747 | A1* | 1/2016 | Solis | ....................... H04L 65/80 726/26 |
| 2016/0127260 | A1* | 5/2016 | Gordon | ................ H04L 65/608 709/226 |
| 2017/0331800 | A1* | 11/2017 | Wood | .................. H04L 63/0464 |
| 2017/0339114 | A1* | 11/2017 | Watson | ................ G06F 16/172 |

FOREIGN PATENT DOCUMENTS

| | | |
|---|---|---|
| CN | 102438172 A | 5/2012 |
| CN | 103186721 A | 7/2013 |
| CN | 103563327 A | 2/2014 |
| WO | 2014209193 A1 | 12/2014 |

OTHER PUBLICATIONS

Fotiou, et al., "Access Control Enforcement Delegation for Information-Centric Networking Architectures," ICN Workshop, SIGSOMM 2012, Helsinki, Aug. 2010, http://conferences.sigcomm.org/sigcomm/2012/paper/icn/p85, 6 pages.

Kurihara, et al., "An Encryption-Based Access Control Framework for Content-Centric Networking," IFIP, 2015, 9 pages.

Named Data Networking (NDN) Project "2010-2011 Progress Summary," NSF (Award CNS-1345318), Creative Commons Attribution 3.0, downloaded from http://named-data.net/project/ndn-ar2011-html/ on May 23, 2016, 68 pages.

RFC 3650: Sun S., et al., "Handle System Overview," Network Working Group, Request For Comments: 3650, Nov. 2003, 21 pages.

Smetters, et al., "Securing network content," Palo Alto Research Center, PARC, Technical Report, TR-2009-01, Oct. 2009, 9 pages.

Tourani, et al., "Security, Privacy, and Access Control in Information-Centric Networking: A Survey," IEEE Communications Surveys & Tutorials journal submission, Cornel University Library, https://arxiv.org/pdf/1603.03409, Mar. 10, 2016, 35 pages.

Wong, et al., "Secure Naming in Information-centric Networks," ACM ReArch 2010, Nov. 30, 2010, 6 pages.

* cited by examiner

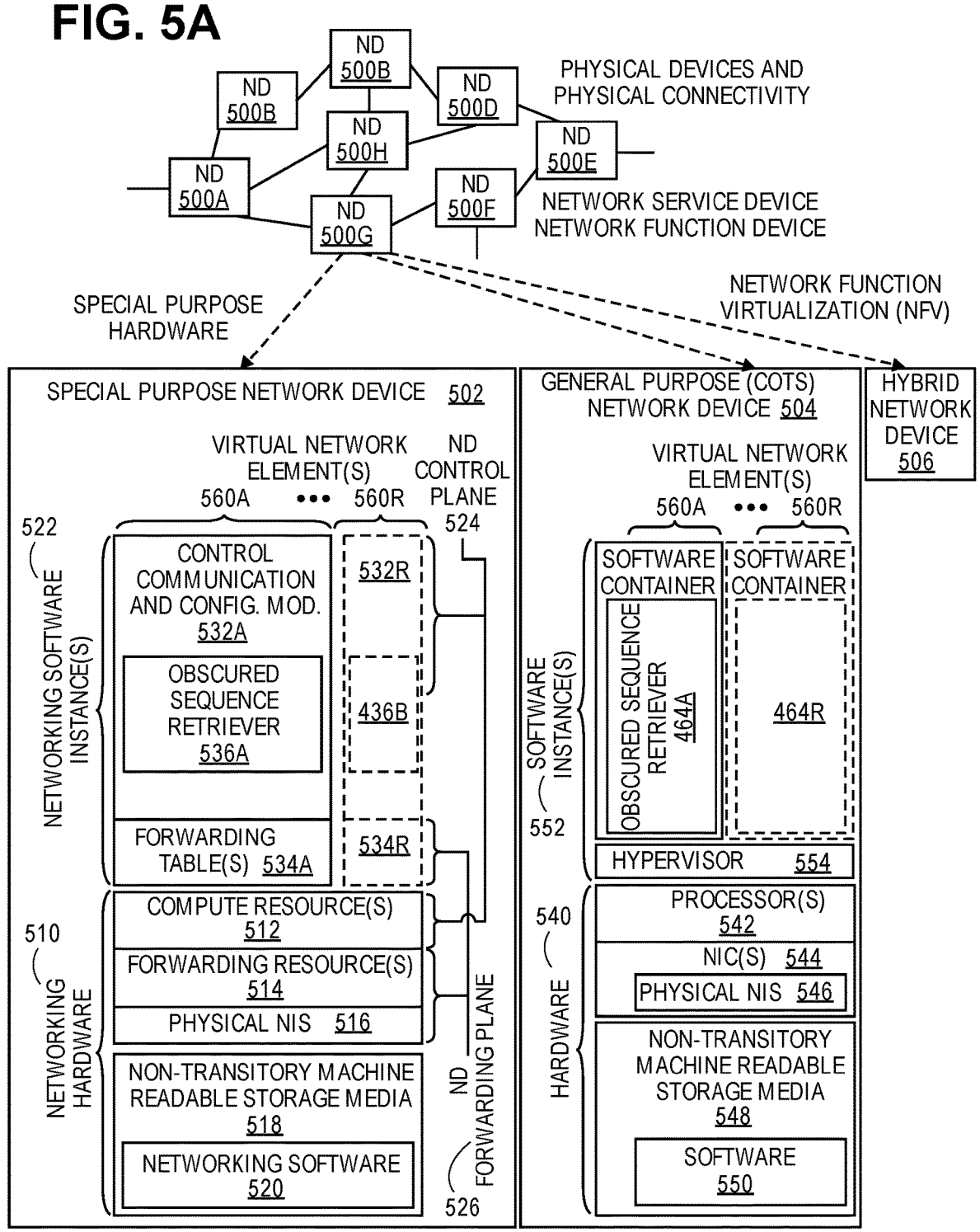

OBSCURED RETRIEVAL SEQUENCE FOR INFORMATION CENTRIC NETWORKING (ICN) ENCODED VIDEO STREAMS

CROSS-REFERENCE TO RELATED APPLICATIONS

This application is a national stage of International Application No. PCT/IB2016/053023, filed May 23, 2016, which is hereby incorporated by reference.

TECHNICAL FIELD

Embodiments of the invention relate to the field of information centric networking (ICN) networks and more specifically, to the secure distribution of content objects in the ICN network.

BACKGROUND

Information centric networking (ICN) is type of network organization and infrastructure for the distribution of content. This network organization is a departure from standard client server network infrastructures that distribute the responsibility for storing and servicing requests for content to a set of nodes in an ICN network. ICN utilizes a system where a content object can be obtained by any client of the ICN network using a network wide or 'global' content object name. Thus, obtaining content in the form of content objects is location independent in contrast to the conventional client server network where the client must know the server (i.e., the network address) on which content is located to request such content.

In an ICN network a client sends an interest identifying a content object to any node in the ICN network. The node or content node that receives the interest from the client, then checks whether any content store local to that content node contains the content object that is identified in the interest. If the content object is not local, then the content node may then advertise the interest or identify a source of the content object to retrieve the content object on behalf of the client. Once the content node retrieves the content object on behalf of the client, the content node can provide a copy of the content object to the client. The content node may then store a copy of the content object in a local content store anticipating the case where a further request is made for the content object from any other client connecting to the content node.

However, managing access and control for the content objects in the ICN network can be problematic. Some content objects may be encrypted to protect them from being accessed by clients that are not authorized to access these content objects. For example, with video content and delivery support for digital rights management (DRM) is limited to basic encryption of the video content at a common point in time for all consumers/clients. However, with such a protection scheme any consumer that obtains the encryption key can trivially share this key with other unauthorized consumers granting them access to the encrypted content. Thus, this protection scheme is not workable for a robust DRM system where for example a publisher wants to sell or rent digital video content to a large set of potential consumers.

SUMMARY

In one embodiment, a method is implemented by a network device operating as a content node for securely distributing a content object over an information centric networking (ICN) network. The method implements a unique obscured retrieval sequence. The method includes receiving an interest for a chunk of the content object from a client device, where the chunk is identified with an obscured chunk identifier, translating the obscured chunk identifier into a general chunk identifier for the content object, and sending the chunk of the content object to the client device.

In another embodiment, a network device executes the method for securely distributing a content object over the ICN network. The network device functions as content node in the ICN network. The method to implement a unique obscured retrieval sequence. The network device includes a non-transitory storage medium having stored therein an obscured sequence retriever, and a processor coupled to the non-transitory storage medium. The processor executes the obscured sequence retriever. The obscured sequence retriever receives an interest for a chunk of the content object from a client device, where the chunk is identified with an obscured chunk identifier, translates the obscured chunk identifier into a general chunk identifier for the content object, and sends the chunk of the content object to the client device.

In one embodiment, a computing device implements a plurality of virtual machines for implementing network function virtualization (NFV), where a virtual machine from the plurality of virtual machines is configured to execute the method for securely distributing a content object over the ICN network. The method implements the unique obscured retrieval sequence. The computing device includes a non-transitory storage medium having stored therein an obscured sequence retriever, and a processor coupled to the non-transitory storage medium. The processor executes a virtual machine from the plurality of virtual machines. The virtual machine executes the obscured sequence retriever. The obscured sequence retriever receives an interest for a chunk of the content object from a client device, where the chunk is identified with an obscured chunk identifier, translates the obscured chunk identifier into a general chunk identifier for the content object, and sends the chunk of the content object to the client device.

In a further embodiment, a control plane device is configured to implement at least one centralized control plane for a software defined network (SDN). The control plane device executes the method for securely distributing a content object over the ICN network. The method implements a unique obscured retrieval sequence. The control plane device includes a non-transitory storage medium having stored therein an obscured sequence retriever, and a processor coupled to the non-transitory storage medium. The processor executes the obscured sequence retriever. The obscured sequence retriever receives an interest for a chunk of the content object from a client device, where the chunk is identified with an obscured chunk identifier, translates the obscured chunk identifier into a general chunk identifier for the content object, and sends the chunk of the content object to the client device.

BRIEF DESCRIPTION OF THE DRAWINGS

The invention may best be understood by referring to the following description and accompanying drawings that are used to illustrate embodiments of the invention. In the drawings:

FIG. 5A illustrates connectivity between network devices (NDs) within an exemplary network, as well as three exemplary implementations of the NDs, according to some embodiments of the invention.

FIG. 5B illustrates an exemplary way to implement a special-purpose network device according to some embodiments of the invention.

DETAILED DESCRIPTION

Figure 1:
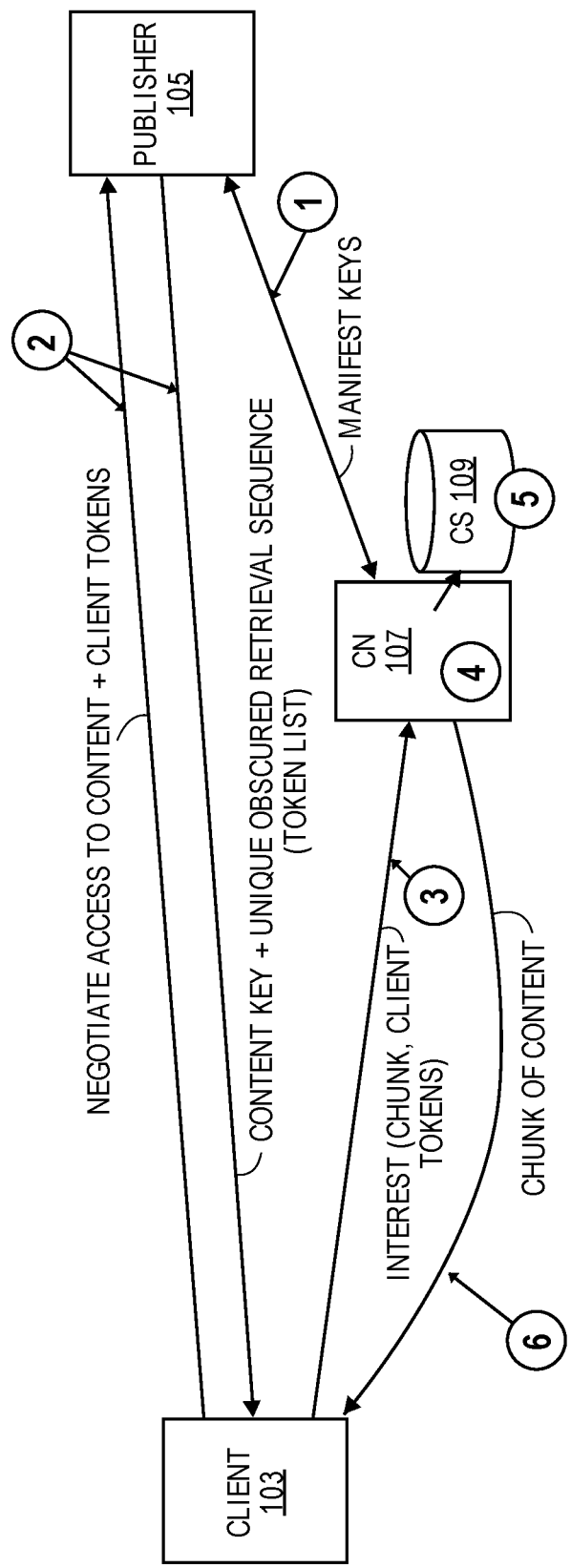
FIG. 1 is a diagram of one embodiment of an information centric networking (ICN) network.

The following description describes methods and system for providing a mechanism for protecting content in an information centric networking (ICN) network. The method and system implement an obscured retrieval sequence for a content object published as a set of chunks to be consumed in a set order such as encoded video streams and similar content provided by the ICN network. The method is applicable to any content that can be partitioned at the application layer and requires in order delivery in order to be usefully consumed. Examples would include video partitioned into a large number of chunks, or a book partitioned into pages. The method provides a mechanism by which a publisher can control access to such content objects on a per consumer or client basis. The method involves a set of processes carried out between the client, publisher and a content node in the ICN. The publisher provides a manifest key to the content node and negotiates access to a content object with a client including generating a unique obscured retrieval sequence in the form of a list of chunk identifiers to be used by the client. This unique obscured retrieval sequence is provided to the client where the client is expected to request chunks using chunk identifiers in the order provided in the obscured sequence in order to have the content delivered in the correct sequence. If the content object is also encrypted the content key may be provided to the client at the same time. The client can then use the content key and the unique obscured retrieval sequence to retrieve the content object from the content node in the ICN in the form of a series of interest requests in individual chunks of the content object requested in the sequence specified in the obscured retrieval sequence. The client device sends interests for each chunk of a content object according to the obscured retrieval sequence using an obscured chunk identifier for the requested chunk. The content node uses the manifest key, which is a combination of customer identification and a shared secret with the publisher to translate the obscured chunk identifier in the interest request into the unobscured or general chunk identifier such that for a given relative position in the obscured chunk list (corresponding to a desired position in the content e.g. book page or point in a video), the content node can correctly derive the correct chunk to deliver to the client.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

As used herein the term "consumer," refers to a client device operated by a user that contacts a publisher (i.e., a server or similar device operated by a publisher) that will consume content (e.g., in the form of a content object) delivered via a content network. A "publisher" is the administrator of a 'publisher device' that provides an original source of content packaged for distribution via ICN and made available on an ICN network. A "trusted portion" of the ICN network are the connections and communication that occurs between content nodes and/or between content nodes and publisher devices. The "untrusted portion" of the ICN network is the connections and communications of the network between consumers and the content nodes. The "trusted portion" may use encryption and or similar secured connections and may manage content objects according to defined protocols. A client device or consumer and the content nodes may communicate without encrypted or secure communications.

The prior art ICN networks have disadvantages that are overcome by the embodiments of the invention. Current ICN networks have access control problems in particular with the control of access to content on a per consumer or client device basis. The premise of ICN is that the client can trust the content without trusting the source, however this is a one-way relationship in that there is not a mechanism for the publisher to trust the client and enforce a business relationship. The primary method for protecting content placed in a public domain is by using encryption, but in an ICN infrastructure this requires disseminating a common key to all receivers of the content to enable them to decrypt the content. This is due to the lack of a centralized distribution of the content such as in the standard client server relationship, where a key specific to a consumer can be utilized to deliver content. In the ICN infrastructure the content is not provided by a single source and is available at any content node to be provided to a requesting client device and/or consumer. Once the common key has been received by a client device or consumer (or intercepted) then it can be shared far more easily and untraceably by a malicious consumer than a cracked (i.e., decrypted) copy of the content, because any client can request the content from the ICN network and use the key to access it, in contrast to having to redistribute the decrypted copy which can require significant overhead for widespread distribution.

The embodiments overcome these limitations of the prior art. The embodiments identify that it would be useful if further protection could be applied to the content in a form that was not a one to many invariant shared secret. The embodiments address the issue need to uniquely protect the content and enforce access rights such that simply sharing keying material obtained by trusted means is inadequate to permit a third party "useful" access to video content. Thus the embodiments provide an alternative to trying to protect against "harvesting and republishing" of content, which may be an intractable problem without untamperable hardware that does not permit digital harvesting.

The embodiments address the problem at a high level based on the notion that the content will only have value if it can be consumed in the correct sequence. This applies to scenarios where the content (e.g., packaged as a content object) is of a considerable size (e.g., many megabytes or more of data, such as video content) such that the content is delivered in "chunks" or portions of the entirety. In prior art, the content may be delivered in a sequence of chunks that is predictable, such as from start to finish. For example, adaptive media delivery (e.g., MPEG DASH) typically fetches and plays between a two second and ten second chunk of content at a time, which means out of order presentation and/or delivery of these chunks of the content would quickly render content unwatchable.

If the true order of sequencing the chunks can be obscured uniquely per consumer AND the true order is never presented in the clear between the trusted and untrusted portions of the ICN network, then correct sequence information cannot be shared with unauthorized consumers. Therefore, the solution of the embodiment's centers around providing each consumer with a unique 'personalized' chunk "sequence" that obscures the true playback order (which is never revealed in the untrusted part of the content network).

The embodiments may utilize adaptive encodings for content objects (e.g., video) in the ICN network. Chunk identifier and encoding may be added to the ICN name structure to enable some embodiments. The embodiments solve this problem with a focus on an assumed adaptive video encoded for ICN. For the embodiments, the content object name may be expected to be in the form of publisher/content_name/chunk/encoding thereby making the chunk and encoding information a part of the ICN infrastructure. The 'chunk' identifies a specific chunk of a content object, the encoding defines the video profile (i.e., the sequence and/or type of encryption) the content is encoded in, and the publisher and content name are global identifiers of the publisher device and the content object, respectively.

If content encryption is used, there is a shared secret between the publisher and ALL consumers of the content for each item of content (i.e., for each content object). This is one mechanism of enforcing access rights commonly employed in ICN, which is encryption of the content. The shared secret is obtained from the publisher directly by means outside of ICN. The process of using unique obscured sequences for access control is not dependent on the content object being encrypted, rather it is an option for additional security. The embodiments may utilize a shared secret between the publisher and the content nodes, hence there is also a trust relationship between the content network and the publisher device.

The embodiments utilize a mechanism to permit client requests to be differentiated from requests that have been relayed within the content network (e.g. trusted and untrusted requests). Content naming will not necessarily be intuitive or transparent, therefore some form of translation may be utilized between the consumer and the content node and the more formalized content naming structure of ICN, and in particular adaptive encodings of content objects.

If ICN is used completely independent of the publisher, the publisher may not be able obtain analytics with respect to content object access by consumers. To provide such feedback and analytics to the publisher the process and system the embodiment may support dialog between the consumer and the publisher, e.g. a portal. Such a dialog serves several purposes including permitting the consumer to obtain ICN naming information corresponding to some "human friendly" content object identification (e.g. unstructured name or icon) that will permit them to fetch ICN published content objects, permitting the publisher to obtain analytics with respect to content access, enforcement of any business relationship between the consumer and the publisher, where successful agreement/contract results in the distribution of access credentials from the publisher to the consumer and similar goals.

The methods and processes ensure that key information (e.g., the authoritative clear text correct sequence of content playback) is never revealed by the publisher to unauthorized consumers. Such key information is only incrementally exposed at content nodes via decrypting customer requests one "chunk" at a time. The unique obscured retrieval sequence is uniquely encoded per consumer, so sharing a copy of a key or unique obscured retrieval sequence will not result in retrieval of a correct playback sequence by other consumers.

In an example embodiment, an ICN network provider that operates a managed video service would be in a position both to act as a publisher and a content network operator, therefore many of the potential organizational obstacles to ICN technology adoption in a multi-actor environment where the embodiments would likely be employed would appear to be addressed by such a scenario.

FIG. 1 is a diagram of one embodiment of an information centric networking (ICN) network. The illustrated ICN network is a simplified representation for sake of clarity in describing the relevant aspects of the embodiments. The illustrated ICN network includes a client device 103, publisher device 105, content node 107 and content store 109. One skilled in the art would understand that these components can be interconnected using any number of intermediate networking devices and by any type of communication medium. These component can be part of a local area network (LAN), a wide area network (WAN) or similar network topology. In particular, it would be understood that there can be any number of content nodes 107 in the ICN network and that the client device 103 may contact the content node 107 with the closes proximity, fastest connection or based on similar criteria.

The client device 103 can be any type of computing device including a personal computer, handheld device, console device, or similar computing device. This client device is the consumer in this paradigm where the client device 103 executes software and is directed by a user to access content originally provided by a publisher via a publisher device 105. The publisher device 105 can be a single computing device, a set of computing devices, a server, cloud system or similar system. Any number of publishers of content may have publishing devices 105 connected to the ICN network. For sake of clarity an example with a single publisher and publisher device 105 is provided. The publisher device 105 executes the software that distributes a content object into which content has been encoded. The content object is made available in the ICN network and when accessed by content nodes 107 may be cached and accessible in content stores 109 local to those content nodes 107 that have accessed the content object or where the ICN network has otherwise determined to pre-position and distribute the content object.

The content nodes 107 in the ICN network can also be any type of computing device including network devices. The content nodes 107 may be special purpose networking devices or general purpose computing devices that execute software to implement the servicing of interest requests for the ICN network and that facilitate the retrieval and local storage in a content store 109 of content objects for client devices 103 that may connect to the content nodes 107. The ICN network can include any number and any variety of content nodes 107 with varying size and configuration of content stores 109 attached to or accessible to these content nodes 107. The content stores 109 can be computing devices, networking devices or storage devices in communication with an administering content node 107. The content stores 109 store any number of content objects. The content nodes 107 and content stores 109 generally service interests (i.e., requests) for content objects that are identified by the globally unique content object name. These content object names as discussed above may have a "human readable) format or any other type of format. In some embodiments, the content object names have a publisher/content_name/chunk/encoding format at the content node and contents store. However, a client may use an alternate, simplified or shortened version of the content object name when issuing an interest in the content object, in which case the content node may be configured to translate this received content object name into the actual content object name where the received interest may include versions of the content object name that are not globally unique.

The ICN network as relates to the embodiments for the unique obscured retrieval sequence operates such that when a publisher via its publisher device 105 has new content to be published to the ICN network it encodes and/or encrypts the content as a content object. The content object is then made available via the publisher device or alternatively distributed to content nodes 107 and content stores 109 within the ICN network. The publisher via the publishing device 105 establishes a secure association with trusted content nodes 107, and shares its "manifest key" with the content nodes 107. The "manifest key" are the encryption keys necessary for encrypting or decrypting the retrieval sequence. The manifest key may be associated with a content object or simply with a publisher and apply to all obscured retrieval sequences. These manifest keys and the content object may be stored in the content store 109 along with the content object name with the above-referenced format. This is shown as (step) 1 in the illustration.

At any point in time thereafter, a consumer via a client device 103 may negotiate access to content (i.e., in the form of a content object) from the publisher via the publisher device 105, and in the process offers directly or indirectly unique tokens identifying the user/subscriber to enable the publisher to authenticate the user/subscriber. In response, the publisher device 105 sends the client device 103 a copy of any encryption key or associated information related to the encryption of the content object in which the desired content is encoded and more specifically the encryption of the subdivisions of such content object into "chunks." The client device 103 is also provided the unique obscured retrieval sequence, which is a sequence of the chunks of the content object, which if requested in sequence by the client, will be correctly translated to the required playback sequence by the content network. This unique obscured retrieval sequence is an algorithmically transformed sequence of the basic sequence of chunks using one or more tokens of information unique to the consumer and then each entry encrypted using the publishers "manifest key" for encryption. For example, every chunk number may be logically derived by application of the XOR function with the consumers Internet Protocol (IP) address and then encrypted with the manifest key. This is shown as (step) 2 in the illustration.

After the consumer via the client device 103 has obtained the unique obscured retrieval sequence, the consumer requests a content object and more specifically a chunk of this content object at a given encoding from the ICN network. This is shown as (step) 3 of the illustration. The consumer via the client device 103 sends an interest including the content object name and client tokens, specifically those client tokens provided to the publisher. Thus, where the above-reference format is used, the content name is /publisher/content_name/obscured_chunk_number/encoding along with the tokens used during initial negotiation by the consumer via the client device 103 with the publisher via the publisher device 105. The provision of these tokens and the content object number enables the content node 107 that receives the interest to determine the unique obscured retrieval sequence and implement it in response to the received interest once the content object with the content object name is located.

Upon receiving the interest and examining the content object name, the content node 107 recognizes that this interest is for a content object where translation of an obscured retrieval sequence is to be applied. The content node, based upon the publisher in the content object name of the received interest, looks up the publisher's manifest key and uses it to decrypt the appropriate obscured chunk number, and then do the inverse algorithmic transform unique to the consumer to determine the proper chunk to return to the consumer. This is illustrated as (step) 4.

The content node 107 can then determine if the identified chunk is locally cached (e.g., in a content store 109), or needs to be fetched from deeper in the ICN network including if not available in greater proximity from the publisher device 105. This is illustrated as (step) 5. The requested chunk of the content object is delivered to the consumer once located. The requested chunk is encoded according to the unique obscured retrieval sequence. This is shown as (step) 6. A next interest in a next chunk (or set of chunks) is then sent by the client device 103. A chunk can have any size and the client device and consumer can request any number of chunks according to the unique obscured retrieval sequence. The client device 103 and consumer can continue to request the chunks at any rate suitable for the consumer until all of the chunks of the content object have been received or until the consumer curtails the access to the content object. If interests are received that do not conform to the unique obscured retrieval sequence, then the chunk provided by content node will not be in proper sequence and/or properly decodable thereby rendering it useless data.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 2:
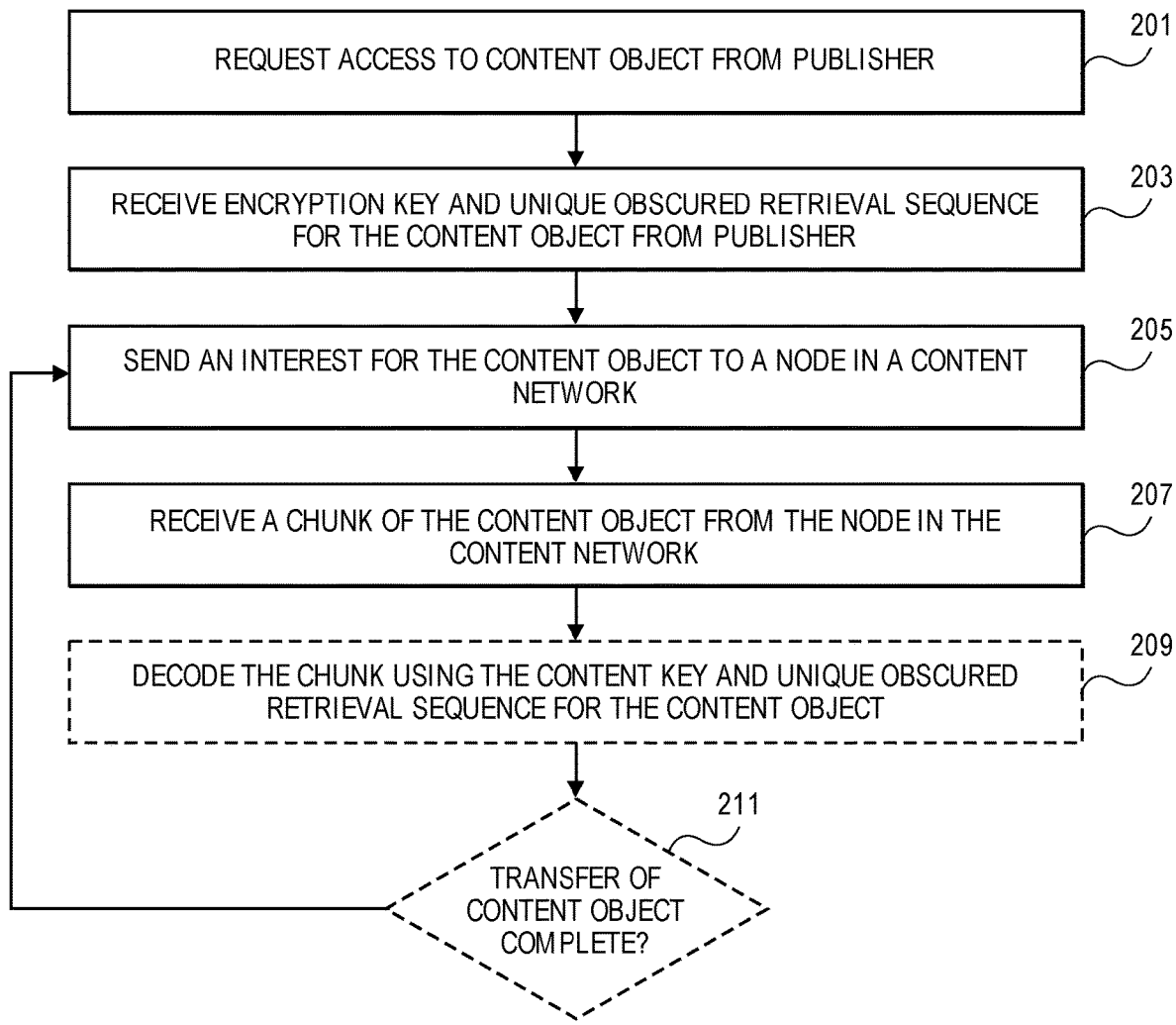
FIG. 2 is a flowchart of one embodiment of a process for a client in the ICN network to obtain a content object.

FIG. 2 is a flowchart of one embodiment of a process for a client in the ICN network to obtain a content object. The process for the unique obscured retrieval process as it is implemented at a client device is set forth in the flowchart. The process for the client device as it executes software that is the consumer of content from a publisher, begins with a request to the publisher device for access to a particular content object (Block 201). More broadly, this is a request by the consumer for the content from the publisher, however, by implementation the client device initiates the communication with the publisher device over a network or similar communication channel.

In response to initiating communication and requesting access to a content object from the publisher, the client device receives an encryption key and unique obscured retrieval sequence for the content object from the publisher via the publisher device (Block 203). The unique obscured retrieval process can be generated using any algorithm that produces a unique retrieval sequence on a per consumer basis. Such algorithms, as discussed below can utilize a token or unique identifier of the consumer such as an IP address of the client device as an input to deterministically generate the retrieval sequence.

Once the client device receives the unique obscured retrieval sequence and the encryption key from the publisher via the publisher device, the consumer via the client device can send an interest for individual chunks of the content object into the ICN network (Block 205). The interest can specify the content object and more particularly a set of chunks of the content object. A 'set,' as used herein, can refer to any whole number of items including one item, which would be the common case. The content object name can be specified or derivatives thereof. The interest also includes any token or similar information provided by the consumer via the client device to the publisher that was utilized to generate the unique obscured retrieval sequence such that the function of the content node is effectively stateless. In this way the content node that services the interest in the ICN network will have sufficient information to correctly identify and provide the chunks of the requested content object according to the unique obscured retrieval sequence.

In response to sending the interest, the consumer via the client device receives the chunk that is next or the set of chunks that are next according to the unique obscured retrieval sequence (Block 207). Further, these chunks are encoded according to the unique obscured retrieval system such that the encoding is specific to the consumer and/or client device. Thus, the client device can decrypt the received chunks for the consumer to utilize by using the encryption key provided by the publisher along with the unique obscured retrieval sequence (i.e., the reversal of the algorithm). (Block 209). The process of sending interests in further chunks of the content object and the receipt of these chunks in accordance with the unique obscured retrieval sequence can continue until the entire content object has been transmitted to the consumer or the consumer no longer seeks to obtain the content object (e.g., a user stops watching a video) (Block 211).

Figure 3:
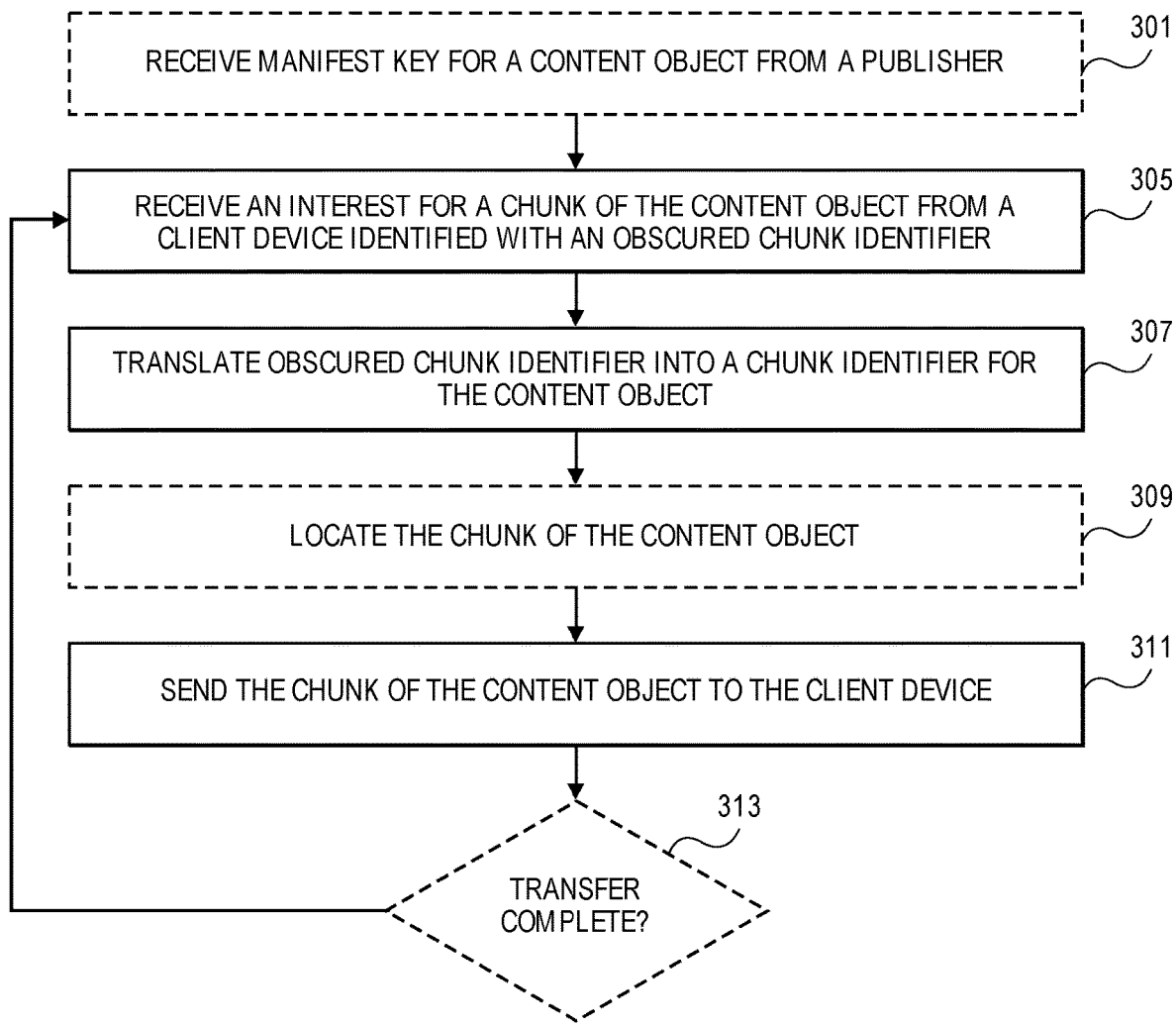
FIG. 3 is a flowchart of on embodiment of a process for a content node in the ICN network serving a request for the content object.

FIG. 3 is a flowchart of on embodiment of a process for a content node in the ICN network serving a request for the content object. In one embodiment, the content node will have a priori knowledge of the publisher's manifest key. In other embodiments, the publisher may provide the manifest key and/or other encryption key (however, typically encryption keys are distributed via the ICN architecture) for a content object via the publisher device (Block 301). In some embodiments, the publishing device may have also provided a copy of the content object or any portion thereof as a result of having received other client interests. In this case, the content object or some portion thereof (e.g., a set of chunks of the content object) may be stored in a content store local to the content node.

A client device may contact the ICN network and any content node therein to obtain the content object. Any content node in the ICN network can receive the interest (Block 305). The received interest can include a content object name. The content object name may be a full content object name or any derivative thereof. The received interest may also include any client token or similar information that is to be utilized to implement the unique obscured retrieval sequence at the content node. Using the provided information, the content node determines the unique obscured retrieval sequence for the content object identified by the interest received from the client device. Specifically, the content node that receives the interest for the content object uses the client tokens and publishers manifest key to translate the obscured chunk request into a request for the chunk with a general chunk identifier (Block 307), and checks for the content object and/or the specifically requested chunk in a local content store (Block 309). The content node locates the chunk of the content object to be provided to the client device using the general or unobscured chunk identifier. The chunk can be located local to the content node or retrieved from the ICN network and/or the publisher device.

Once the chunk is retrieved, then it is sent to the client device that sent the interest in the specified chunk of the content object (Block 311). This process may continue until a content object is completely transferred or until the consumer ceases sending the requests to ICN network (Block 313). Each received interest can specify a single chunk or any number of chunks for a given content object. The example of requesting a single chunk is provided for sake of clarity and conciseness. However, one skilled in the art would understand that the embodiments can encompass any grouping of chunks or similar segmentations of a content object into a unique obscured retrieval process.

Additional Considerations

Security is enhanced if the original sequence numbers were obscured in the first place in a form unique to each "content name" item. If a content object is always decrypted/ transformed to a predictable sequence 1, 2, 3, 4 etc. then the job of a brute force attack to determine the publishers manifest key is simplified. The use of the subscriber's IP address (as translated to a network global) is fraught with a number of issues (e.g. when chains of network address translation (NATs) are used), but is one of the few identifiers that is typically policed by the network via anti-spoofing mechanisms therefore is a desirable "unique token" to be used as an input into the content sequence obscuring process. The requirement being that the ICN network needs to "see" the same IP address that the publisher "sees."

Variations

Additional protection against replay attacks can be achieved by using a key schedule on the manifest and encryption keys such that a given manifest sent to a consumer has a limited lifetime AND cracking the manifest or encryption key only compromised manifests encoded with that key that a malicious consumer got access to. There can be a time component factored into the content obscuring sequence such that an obscured sequence is only valid for a fixed period of time. Any number and combination of additional obscuring steps can be applied to the algorithmic transform using the consumer supplied tokens to further complicate hacking of the manifest key.

Architecture

Figure 4:
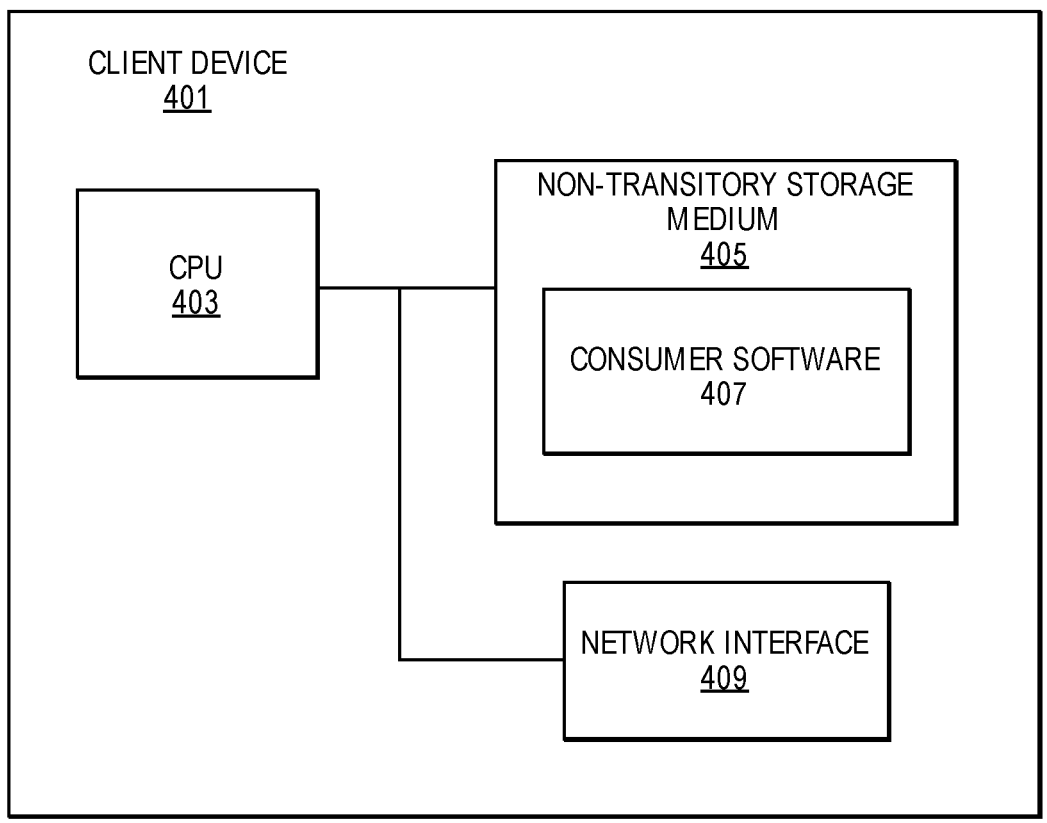
FIG. 4 is a diagram of one embodiment of a client device.

FIG. 4 is a diagram of one embodiment of a client device for a consumer of content attached to an ICN. The client device 401 can be any type of computing device and the client device 400 illustrated is provided by way of example and not limitation. The client device can be desktop, laptop, handheld, console device or similar computing device. The client device can include a central processing unit 403 or similar processing device. In other embodiments, the computing device can include any number or variety of processing devices. The processing devices can include any type of processing device including CPUs, graphical processors, application specific integrated circuits (ASICS), systems on a chip (SOCs) and similar processors. The processor can communicate with other components of the client device 401 using a bus or similar interconnect.

The client device 401 can include a non-transitory storage medium 405. The non-transitory storage medium can be any type of storage device including optical, magnetic, solid state or any similar storage medium. The client device 401 can include any number and variety of such devices. The non-transitory storage medium 405 can store code, operating systems, data and any information relevant to the client device 401 and any user of the client device 401. The stored information can include consumer software 407 that can be any type of executable code a software that consumes content obtained from an ICN network. For example, the consumer software 407 can process and play video content for a user via a locally connected display or through a similar mechanism local or remote from the client device 401.

The client device 401 can include any number of interfaces to connect with other devices and components. In particular, the client device 401 can include a network interface 409 that enables the client device 401 to communicate with content nodes of the ICN network. The network interface 409 can be a wired and/or wireless interface. The components of the client device 401 are provided by way of example. The client device 401 can include any number of additional components, which have been omitted for sake of clarity.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a special-purpose operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R. In some embodiments, the compute resources 512 execute an obscured sequence retriever 536A-R that implement the functions of content node as described herein above.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R. In some embodiments, the processors 542 execute an obscured sequence retriever 564-R as applications that implement the functions of content node as described herein above within the software container 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the NIC(s) 544, as well as optionally between the instances 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 5C:
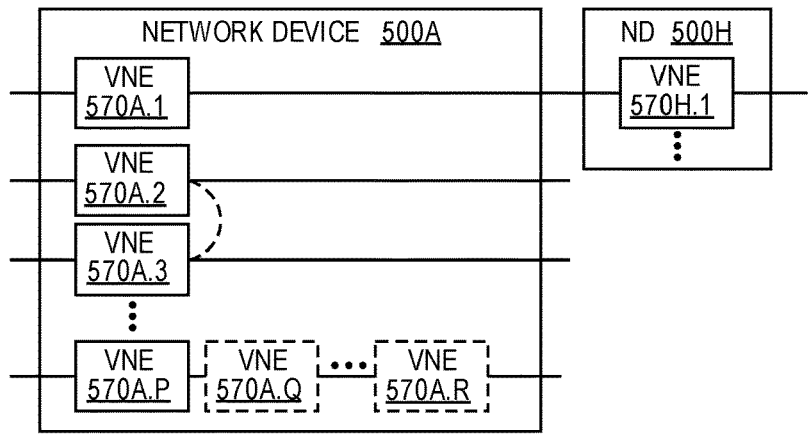
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 5D:
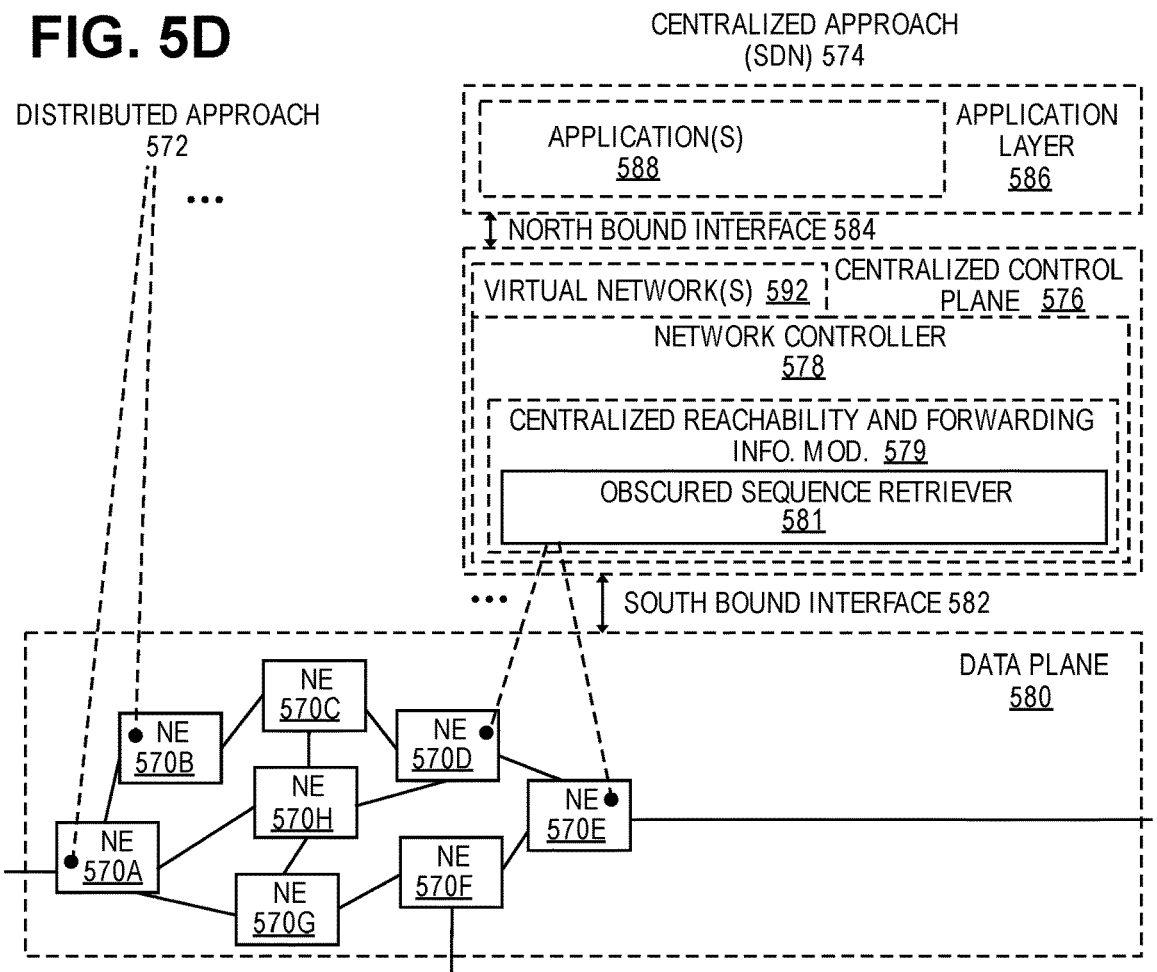
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal). In some embodiments, the centralize control plane 576 executes an obscured sequence retriever 581 that implement the functions of content node as described herein above. In other embodiments, the obscured sequence retriever is implemented as an application 588.

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
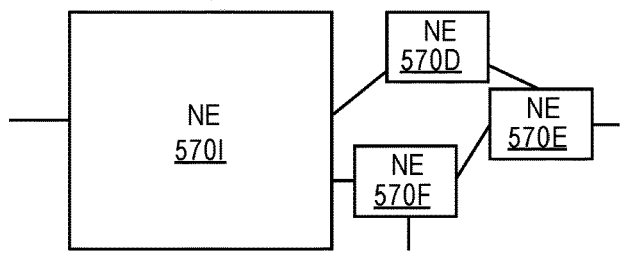
FIG. 5E illustrates the simple case of where each of the NDs implements a single NE, but a centralized control plane has abstracted multiple of the NEs in different NDs into (to represent) a single NE in one of the virtual network(s), according to some embodiments of the invention.
Figure 5F:
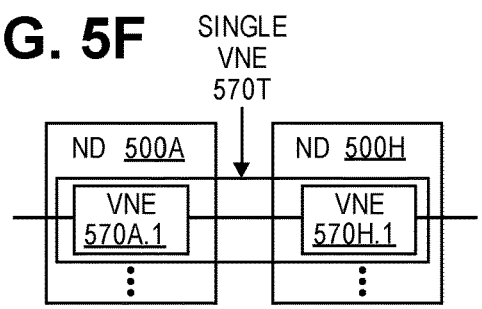
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
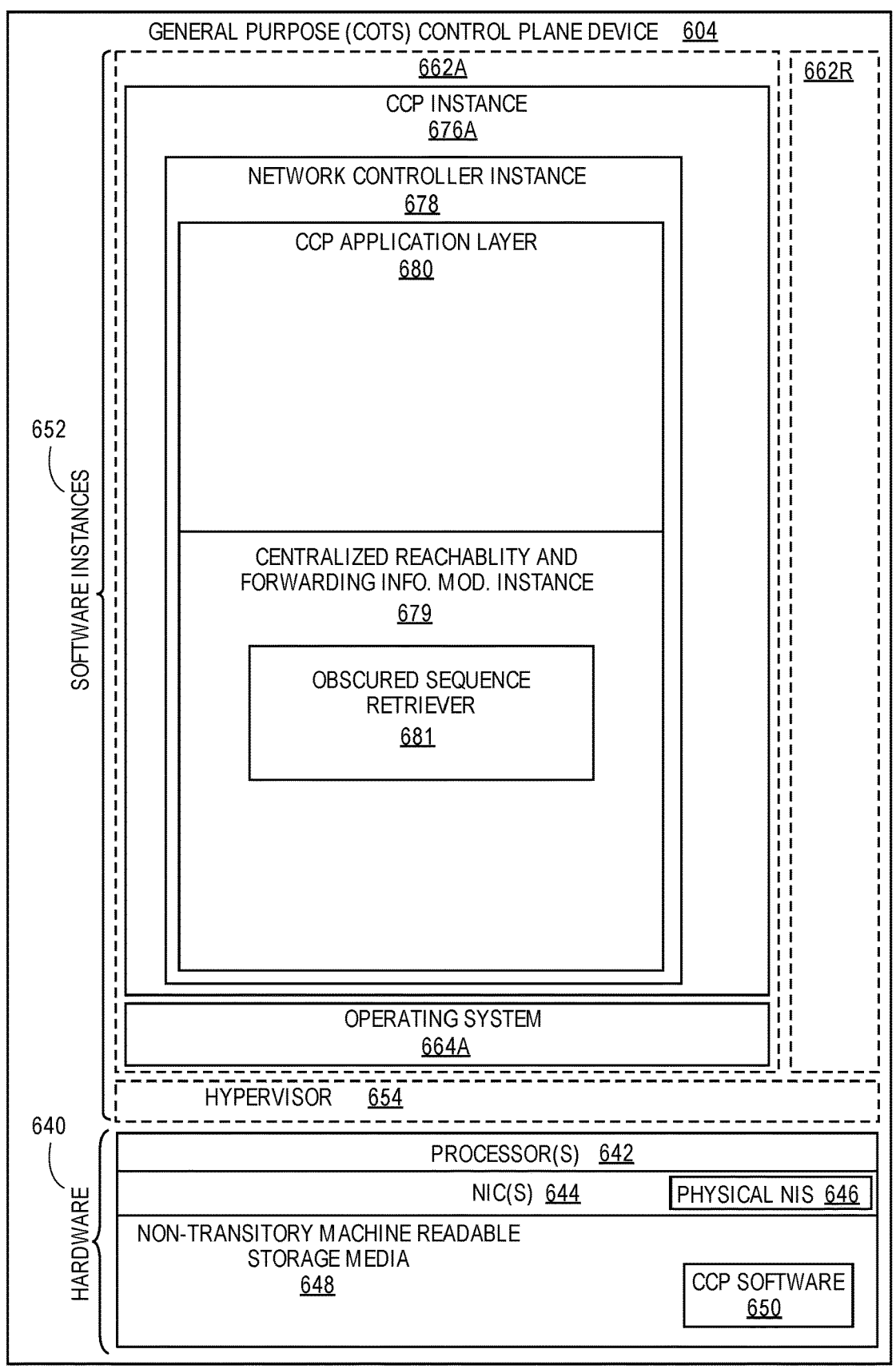
FIG. 6 illustrates a general purpose control plane device with centralized control plane (CCP) software, according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (VMM)) or a hypervisor executing on top of a host operating system, and an application is run on top of a guest operating system within an instance 662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view. In some embodiments, the processors 642 execute an obscured sequence retriever 681 that implement the functions of content node as described herein above.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet. Once a specific forwarding table entry has been programmed into the data plane 480 by the centralized control plane 476, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device operating as a content node for securely distributing a content object over an information centric networking (ICN) network, the method to implement a unique obscured retrieval sequence, the method comprising:
   receiving an interest for a chunk of the content object from a client device, where the chunk is identified with an obscured chunk identifier;
   translating the obscured chunk identifier into a general chunk identifier for the content object; and
   sending the chunk of the content object to the client device,
   the method further comprising:
   receiving a manifest key for the content object or a plurality of content objects including the content object from a publisher, wherein the manifest key comprises encryption keys necessary for encrypting or decrypting the retrieval sequence, and
   wherein the general chunk identifier is derived from the unique obscured retrieval sequence using a client token, the manifest key from the publisher and a transform algorithm.

2. The method of claim 1, further comprising:
   locating the chunk of the content object using the general chunk identifier for the content object.

3. The method of claim 1, wherein the interest for the content object includes a client token provided to a publisher.

4. A network device to execute a method for securely distributing a content object over an information centric networking (ICN) network, the network device functioning as content node in the ICN network, the method to implement a unique obscured retrieval sequence, the network device comprising:
   a non-transitory storage medium having stored therein an obscured sequence retriever; and
   a processor coupled to the non-transitory storage medium, the processor to execute the obscured sequence retriever, the obscured sequence retriever to receive an interest for a chunk of the content object from a client device, where the chunk is identified with an obscured chunk identifier, to translate the obscured chunk identifier into a general chunk identifier for the content object, and to send the chunk of the content object to the client device,
   wherein the obscured sequence retriever is further configured to receive a manifest key for the content object or a plurality of content objects including the content object from a publisher, wherein the manifest key comprises encryption keys necessary for encrypting or decrypting the retrieval sequence, and
   wherein the general chunk identifier is derived from the unique obscured retrieval sequence using a client token, the manifest key from the publisher and a transform algorithm.

5. The network device of claim 4, wherein the obscured sequence retriever is further configured to locate the chunk of the content object using the general chunk identifier for the content object.

6. The network device of claim 4, wherein the interest for the content object includes a client token provided to a publisher.

7. A computing device implementing a plurality of virtual machines for implementing network function virtualization (NFV), wherein a virtual machine from the plurality of virtual machines is configured to execute a method for securely distributing a content object over an information centric networking (ICN) network, the method to implement a unique obscured retrieval sequence, the computing device comprising:
   a non-transitory storage medium having stored therein an obscured sequence retriever; and
   a processor coupled to the non-transitory storage medium, the processor to execute a virtual machine from the plurality of virtual machines, the virtual machine to execute the obscured sequence retriever, the obscured sequence retriever to receive an interest for a chunk of the content object from a client device, where the chunk is identified with an obscured chunk identifier, to translate the obscured chunk identifier into a general chunk identifier for the content object, and to send the chunk of the content object to the client device,
   wherein the obscured sequence retriever is further configured to receive a manifest key for the content object or a plurality of content objects including the content object from a publisher, wherein the manifest key comprises encryption keys necessary for encrypting or decrypting the retrieval sequence, and
   wherein the general chunk identifier is derived from the unique obscured retrieval sequence using a client token, the manifest key from the publisher and a transform algorithm.

8. The computing device of claim 7, wherein the obscured sequence retriever is further configured to locate the chunk of the content object using the general chunk identifier for the content object.

9. The computing device of claim 7, wherein the interest for the content object includes a client token provided to a publisher.

10. A control plane device configured to implement at least one centralized control plane for a software defined network (SDN), the control plane device configured to execute a method for securely distributing a content object over an information centric networking (ICN) network, the control plane device functioning as content node in the ICN network, the method to implement a unique obscured retrieval sequence, the control plane device comprising:
   a non-transitory storage medium having stored therein an obscured sequence retriever; and
   a processor coupled to the non-transitory storage medium, the processor to execute the obscured sequence retriever, the obscured sequence retriever to receive an interest for a chunk of the content object from a client device, where the chunk is identified with an obscured chunk identifier, to translate the obscured chunk identifier into a general chunk identifier for the content object, and to send the chunk of the content object to the client device,
   wherein the obscured sequence retriever is further configured to receive a manifest key for the content object or a plurality of content objects including the content object from a publisher, wherein the manifest key comprises encryption keys necessary for encrypting or decrypting the retrieval sequence, and
   wherein the general chunk identifier is derived from the unique obscured retrieval sequence using a client token, the manifest key from the publisher and a transform algorithm.

11. The control plane device of claim 10, wherein the obscured sequence retriever is further configured to locate the chunk of the content object using the general chunk identifier for the content object.

12. The control plane device of claim 10, wherein the interest for the content object includes a client token provided to a publisher.

13. The control plane device of claim 10, wherein the general chunk identifier is derived from the unique obscured retrieval sequence using a client token, the manifest key from the publisher and a transform algorithm.

* * * * *